US010189174B2

(12) United States Patent
Brown et al.

(10) Patent No.: US 10,189,174 B2
(45) Date of Patent: Jan. 29, 2019

(54) PORTABLE CUTTING TOOL

(71) Applicant: Positec Power Tools (Suzhou) Co., Ltd, Suzhou (CN)

(72) Inventors: Warren Brown, Mount Evelyn (AU); Harry Szommer, Frankston North (AU); Graham Gerhardt, Warrandyte (AU)

(73) Assignee: POSITEC POWER TOOLS (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 14/595,810

(22) Filed: Jan. 13, 2015

(65) Prior Publication Data

US 2015/0336287 A1 Nov. 26, 2015

Related U.S. Application Data

(63) Continuation of application No. PCT/CN2013/079358, filed on Jul. 15, 2013.

(30) Foreign Application Priority Data

Jul. 13, 2012 (CN) .......................... 2012 1 0243075

(51) Int. Cl.
*B27B 9/02* (2006.01)
*B23D 45/16* (2006.01)
(Continued)

(52) U.S. Cl.
CPC . *B27B 9/02* (2013.01); *B25F 5/02* (2013.01)

(58) Field of Classification Search
CPC .................................. B27L 39/02; B25F 5/02
(Continued)

(56) References Cited

U.S. PATENT DOCUMENTS

| | | | | |
|---|---|---|---|---|
| RE17,087 E * | 9/1928 | Billingley | ................. | B27B 9/02 30/376 |
| 1,830,350 A * | 11/1931 | Crowe | ...................... | B27B 9/02 30/376 |

(Continued)

FOREIGN PATENT DOCUMENTS

| | | |
|---|---|---|
| CA | 964963 A | 3/1975 |
| CN | 1496800 A | 5/2004 |

(Continued)

OTHER PUBLICATIONS

English language abstract and machine-assisted English translation for JP3505696 extracted from www.espacenet.com on May 14, 2015; 16 pages.

(Continued)

*Primary Examiner* — Ghassem Alie
*Assistant Examiner* — Bharat C Patel
(74) *Attorney, Agent, or Firm* — Howard & Howard Attorneys PLLC

(57) ABSTRACT

A portable cutting tool includes a blade and a motor for driving the blade to rotate. The motor has a motor output shaft. A guard assembly includes an upper guard and a lower guard which is used for receiving the motor. A base is connected to the upper guard. The base further includes a front portion connected to the upper guard, a rear portion extending longitudinally, and a gripping portion disposed between the front portion and the rear portion. The blade shaft is perpendicular to the motor output shaft.

18 Claims, 14 Drawing Sheets

(51) Int. Cl.
*B27B 21/00* (2006.01)
*B25F 5/02* (2006.01)
(58) Field of Classification Search
USPC ....... 30/388, 392, 166.3, 514, 517–519, 376
See application file for complete search history.

(56) References Cited

U.S. PATENT DOCUMENTS

| | | | | | |
|---|---|---|---|---|---|
| 1,830,579 | A * | 11/1931 | Wappat | B23D 59/002 | 30/391 |
| 1,830,580 | A * | 11/1931 | Wappat | B27B 9/02 | 30/376 |
| 1,833,785 | A * | 11/1931 | Krieger | B23D 47/126 | 30/376 |
| 1,858,459 | A * | 5/1932 | Ramey | B27B 9/02 | 30/376 |
| 2,346,961 | A * | 4/1944 | Lamb | B27B 9/02 | 30/278 |
| 2,657,719 | A * | 11/1953 | Forsberg | B23D 47/126 | 30/376 |
| 3,262,472 | A * | 7/1966 | McCarty | B27B 9/02 | 30/295 |
| 3,292,673 | A * | 12/1966 | Gregory | B23Q 11/0092 | 30/376 |
| 3,721,141 | A | 3/1973 | Frostad | | |
| 4,221,051 | A * | 9/1980 | Glass | B27B 9/02 | 30/377 |
| 4,353,165 | A * | 10/1982 | Albery | B23D 59/002 | 30/376 |
| 4,516,324 | A * | 5/1985 | Heininger, Jr. | B27B 9/00 | 30/377 |
| 4,856,394 | A * | 8/1989 | Clowers | B23D 59/006 | 30/286 |
| 4,982,501 | A * | 1/1991 | Sauerwein | B27B 9/02 | 30/376 |
| 5,136,910 | A * | 8/1992 | Kuhn | B23D 59/002 | 144/136.1 |
| 5,239,756 | A * | 8/1993 | Matzo | B27B 9/00 | 30/371 |
| 5,481,806 | A * | 1/1996 | Pratt | B27G 19/04 | 30/390 |
| 5,570,511 | A * | 11/1996 | Reich | B27B 9/02 | 30/376 |
| 5,758,425 | A * | 6/1998 | Gallagher | B27B 9/02 | 30/376 |
| 5,850,698 | A * | 12/1998 | Hurn | B27B 9/00 | 30/275.4 |
| 5,856,715 | A * | 1/1999 | Peot | B23D 45/16 | 30/388 |
| 6,026,576 | A | 2/2000 | Hurn et al. | | |
| 6,202,311 | B1 * | 3/2001 | Nickels, Jr. | B27B 9/02 | 30/376 |
| 6,375,557 | B1 * | 4/2002 | Spangenberg | B23Q 11/0046 | 451/344 |
| 6,601,305 | B1 * | 8/2003 | Fukuoka | B27B 9/02 | 30/376 |
| 6,691,418 | B1 * | 2/2004 | Lewin | B27B 9/02 | 30/375 |
| 6,735,875 | B1 * | 5/2004 | Eslambolchi | B23D 45/122 | 30/377 |
| 6,886,259 | B2 * | 5/2005 | Kani | B27B 9/02 | 30/376 |
| 7,103,979 | B2 * | 9/2006 | Yoshida | B23D 59/006 | 30/376 |
| 7,219,435 | B2 | 5/2007 | Yoshida et al. | | |
| 7,328,512 | B2 * | 2/2008 | Martin | B23D 59/006 | 30/124 |
| 7,434,321 | B2 * | 10/2008 | Niwa | B27B 9/02 | 30/376 |
| 7,516,553 | B2 | 4/2009 | Yoshida et al. | | |
| 7,661,194 | B1 * | 2/2010 | Ende | B27B 9/02 | 30/371 |
| 7,958,641 | B1 * | 6/2011 | Ende | B27B 9/02 | 30/376 |
| 8,104,183 | B2 * | 1/2012 | Nakamura | B27B 9/02 | 30/375 |
| 8,495,940 | B2 * | 7/2013 | Abe | B23D 45/042 | 30/388 |
| 8,695,224 | B2 * | 4/2014 | Gehret | B23D 47/12 | 30/388 |
| 8,776,384 | B2 * | 7/2014 | Hartmann | B23D 59/002 | 30/374 |
| 9,044,869 | B2 * | 6/2015 | Xing | B26B 25/00 | |
| 9,089,941 | B2 * | 7/2015 | Moreno | B27G 19/04 | |
| 9,101,993 | B2 * | 8/2015 | Yokota | B23D 59/006 | |
| 9,156,182 | B2 * | 10/2015 | Moreno | B23D 45/16 | |
| 2004/0107584 | A1 | 6/2004 | Yoshida et al. | | |
| 2005/0155231 | A1 * | 7/2005 | Hartmann | B27B 9/02 | 30/377 |
| 2006/0016082 | A1 * | 1/2006 | Niwa | B27B 9/02 | 30/388 |
| 2008/0148915 | A1 * | 6/2008 | Nickels | B25F 5/00 | 83/469 |
| 2008/0244910 | A1 * | 10/2008 | Patel | B23D 45/122 | 30/123 |
| 2009/0133559 | A1 * | 5/2009 | Sargeant | B27B 9/02 | 83/508.2 |
| 2011/0162218 | A1 * | 7/2011 | Roise | B27B 9/02 | 30/377 |
| 2011/0214302 | A1 | 9/2011 | Inayoshi | | |
| 2011/0214547 | A1 * | 9/2011 | Inayoshi | B25F 5/02 | 83/508.2 |
| 2011/0252652 | A1 * | 10/2011 | Zhen | B27B 9/04 | 30/376 |
| 2012/0324742 | A1 * | 12/2012 | Bau-Madsen | B27B 9/02 | 30/376 |
| 2013/0047443 | A1 | 2/2013 | Brown et al. | | |
| 2013/0081286 | A1 * | 4/2013 | Moreno | B27B 9/02 | 30/377 |
| 2013/0145633 | A1 * | 6/2013 | Li | B25F 5/00 | 30/376 |
| 2013/0145634 | A1 * | 6/2013 | Cuzdey | B27B 9/02 | 30/376 |
| 2013/0318801 | A1 * | 12/2013 | Nicholson | B27G 19/04 | 30/377 |

FOREIGN PATENT DOCUMENTS

| | | | | |
|---|---|---|---|---|
| CN | 2908064 | Y | 6/2007 | |
| CN | 201046516 | Y | 4/2008 | |
| CN | 201105482 | Y | 8/2008 | |
| CN | 201175849 | Y | 1/2009 | |
| CN | 201423474 | Y | 3/2010 | |
| CN | 201644918 | U | 11/2010 | |
| CN | 102189294 | A | 9/2011 | |
| CN | 102335785 | A | 2/2012 | |
| CN | 102407381 | A | 4/2012 | |
| CN | 102528854 | A | 7/2012 | |
| CN | 102029431 | B | 1/2013 | |
| CN | 102189293 | B | 12/2014 | |
| DE | 3317904 | A1 | 11/1984 | |
| EP | 0990492 | A3 | 1/2002 | |
| GB | 2302058 | A | 1/1997 | |
| JP | 3505696 | B2 | 3/2004 | |
| WO | WO 2011035718 | A1 * | 3/2011 | B27B 9/00 |

OTHER PUBLICATIONS

English language abstract and machine-assisted English translation for CN201046516Y extracted from www.espacenet.com on May 14, 2015; 12 pages.

English language abstract and machine-assisted English translation for CN102407381A extracted from www.espacenet.com on May 14, 2015; 60 pages.

International Search Report of WO/2014008873A1 dated Oct. 24, 2013; 2 pages.

English language abstract for CN102029431 as well as English language equivalent US2013/0047443; 1 page.

(56) References Cited

OTHER PUBLICATIONS

English language abstract for CN102189293 as well as English language equivalent US2011/0214302; 1 page.
English language abstract for CN102189294 as well as English language equivalent US2011/214547; 1 page.
English language abstract for CN102335785 extracted from espacenet.com database on Jun. 25, 2018; 1 page.
English language abstract for CN102528854 extracted from espacenet.com database on Jun. 25, 2018; 1 page.
English language abstract for CN1496800 extracted from espacenet.com database on Jun. 25, 2018; 1 page.
English language abstract for CN201105482 extracted from espacenet.com database on Jun. 25, 2018; 1 page.
English language abstract for CN201175849 extracted from espacenet.com database on Jun. 25, 2018; 1 page.
English language abstract for CN201423474 extracted from espacenet.com database on Jun. 25, 2018; 1 page.
English language abstract for CN201644918 extracted from espacenet.com database on Jun. 25, 2018; 1 page.
English language abstract for CN2908064 extracted from espacenet.com database on Jun. 25, 2018; 1 page.
English language abstract for DE3317904 extracted from espacenet.com database on Jun. 25, 2018; 2 pages.
English language abstract for EP0990492 extracted from espacenet.com database on Jun. 25, 2018; 1 page.

* cited by examiner

PORTABLE CUTTING TOOL

RELATED APPLICATIONS

This application is a continuation of International Patent Application No. PCT/CN2013/079358, filed on Jul. 15, 2013, which claims the benefit of Chinese Patent No. 201210243075.3 filed on Jul. 13, 2012, the contents of which are incorporated herein by reference.

BACKGROUND

Technical Field

The present invention relates to a power tool, in particular in a portable cutting tool.

Related Art

A conventional portable cutting tool, such as a portable electric circular saw, usually includes a blade used for cutting workpieces; a motor for driving the blade, where an output shaft of the motor is usually perpendicular to the blade; and a main handle, used to be gripped by an operator during operation, where the main handle is disposed perpendicular to the motor. Such electric circular saw includes a base, an upper guard, and a lower guard. The upper guard is located on an upper part of the base for receiving the blade at any time, and the lower guard is located below the base. During working, the lower guard is rotatable to expose a lower part of the blade. Disadvantages of such conventional electric circular saw are that it is large and cumbersome, and an operator cannot use it conveniently.

SUMMARY

One technical problem to be solved by the present invention is to provide a portable cutting tool that is comfortable to operate.

The present invention provides a portable cutting machine, including a blade; a motor for driving the blade to rotate, wherein the motor includes an output shaft; a guard assembly including an upper guard for receiving the blade and a lower guard, wherein the lower guard is rotatable relative to the upper guard to expose the blade to cut a workpiece; a base connected to the upper guard, wherein the base is provided with a blade through-hole for the blade to pass through, and further includes a base bottom portion for abutting against the workpiece and a front side wall extending upwards from the base bottom portion; and a housing, including a front portion connected to the upper guard, a rear portion extending longitudinally, and a gripping portion disposed between the front portion and the rear portion, wherein the blade is rotatably disposed on the front portion by a blade shaft, the motor is rotatably disposed in the rear portion, and the blade shaft is perpendicular to the output shaft.

In the portable cutting tool disclosed in the present invention, by disposing a gripping portion between a front portion and a rear portion that is used for receiving a motor, a fulcrum is formed between the front portion and the rear portion when an operator grips the gripping portion, and parts on two sides of the fulcrum restrict each other under the effect of respective weights, which implements that after a user grips the gripping portion, the portable cutting tool is in a relatively stable state, and a cutting operation can be performed easily, making the operation more comfortable. A blade shaft is perpendicular to an output shaft of the motor, so that the portable cutting tool has a smaller size and a more compact structure.

Preferably, the portable cutting tool further includes a supporting member connected to the base, wherein the upper guard is rotatably connected to the supporting member around a first axis which is parallel with the blade shaft to adjust a cutting depth, and the upper guard is movable between the minimum cutting position at which the blade is not exposed out of the blade through-hole and a maximum cutting position at which the blade is exposed out of the blade through-hole by a maximum dept.

Preferably, in the maximum cutting position, an angle of the longitudinal extending axis of the gripping portion and base bottom portion is not greater than 20 degrees.

Preferably, the supporting member is provided with a first guide slot which is an arc-shaped guide slot, and the center of a circle corresponding to the arc where the first guide slot is located is on the first axis.

Preferably, the upper guard and the first guide slot are respectively disposed on two sides of the front portion.

Preferably, the supporting member is pivotally connected to the base around a second axis which is parallel with the base bottom portion to adjust a cutting angle, wherein the supporting member is provided with a second guide slot which is an arc-shaped guide slot, and the center of a circle corresponding to the arc where the second guide slot is located is on the second axis.

Another technical problem to be solved by the present invention is to provide a portable cutting tool having a high cutting capacity.

To solve the foregoing problem, the present invention provides a portable cutting tool. The portable cutting tool includes a housing; a motor received in the housing; a cutting unit connected to the housing, where the cutting unit includes a blade which is mounted on a blade shaft and driven by the motor to rotate, an upper guard fixedly connected to the housing, and a lower guard which rotates around the axis of the blade shaft to expose the blade; and a base connected to the upper guard, where the base is provided with a blade through-hole for the blade to pass through, and the base further includes a base bottom portion used for abutting against a workpiece and a base front side wall extending upwards from the base bottom portion. The lower guard is rotatably disposed on the blade shaft.

In the portable cutting tool disclosed in the present invention, the lower guard is rotatably disposed on the blade shaft, so as to reduce the diameter of a hub on the lower guard, thereby increasing a usable part of the blade, and further enhancing the overall cutting capacity of the portable cutting tool.

Preferably, the lower guard is rotatably disposed on the blade shaft by a bearing Preferably, the housing includes a front portion connected to the upper guard, a rear portion extending longitudinally, and a gripping portion disposed between the front portion and the rear portion, wherein the motor is rotatably disposed in the rear portion, and the blade shaft is perpendicular to the output shaft.

Preferably, the portable cutting tool further includes a supporting member connected to the base, wherein the upper guard is rotatably connected to the supporting member around a first axis which is parallel with the blade shaft to adjust a cutting depth, and the upper guard is movable between the minimum cutting position at which the blade is not exposed out of the blade through-hole and a maximum cutting position at which the blade is exposed out of the blade through-hole by a maximum dept.

Another technical problem to be solved by the present invention is to provide a portable cutting tool having multiple cutting modes.

To solve the foregoing problem, the present invention provides a portable cutting tool, including: a housing; a motor, received in the housing; a cutting unit, connected to the housing, where the cutting unit includes a blade mounted on a blade shaft and driven by the motor to rotate, an upper guard fixedly connected to the housing, and a lower guard that rotates around the axis of the blade shaft to expose the blade; and a base connected to the upper guard, where the base is provided with a blade through-hole used for the blade to pass through, and the base further includes a base bottom portion used for abutting against a workpiece and a base front side wall extending upwards from the base bottom portion. A friction pad that abuts against a surface of the workpiece is disposed on the base front side wall, and is used for insertion-type cutting.

In the portable cutting tool disclosed in the present invention, a friction pad that abuts against a surface of workpiece is disposed on the base front side wall, and in this manner, the friction pad abuts against the workpiece and rotates around a contacting line between the friction pad and the workpiece, thereby implementing insertion-type cutting, so that the portable cutting tool has multiple cutting modes.

Preferably, the frication pad includes a curved surface for contacting with the workpieces.

Preferably, the housing includes a front portion connected to the upper guard, a rear portion extending longitudinally, and a gripping portion disposed between the front portion and the rear portion, wherein the motor is rotatably disposed in the rear portion, and the blade shaft is perpendicular to the output shaft.

BRIEF DESCRIPTION OF THE DRAWINGS

The present invention is further described in detail below with reference to the accompanying drawings.

DETAILED DESCRIPTION

Figure 1:
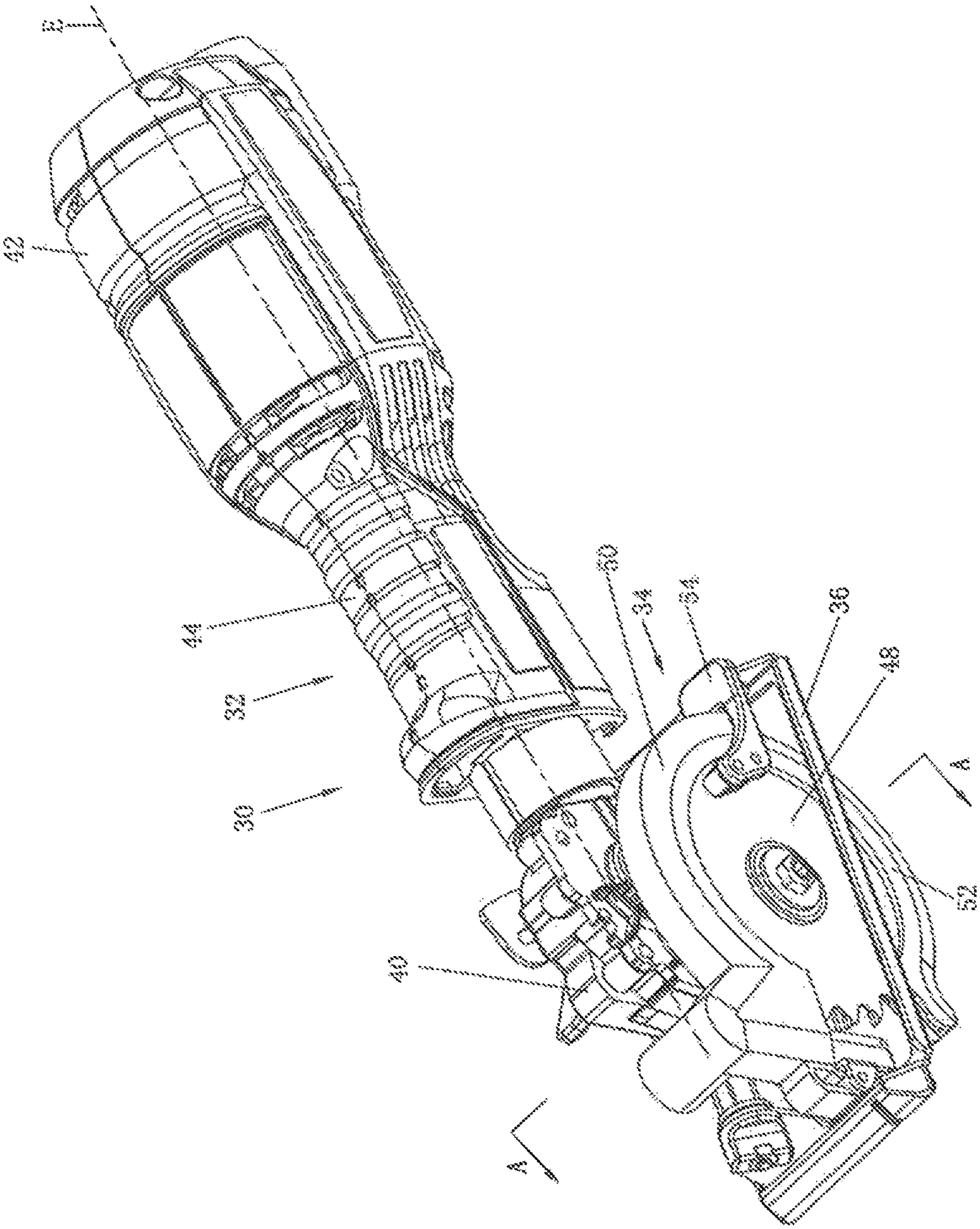
FIG. 1 is a three-dimensional view of a portable cutting tool in a first embodiment of the present invention.

Referring to FIG. 1, an embodiment of the present invention provides a portable cutting tool 30. The portable cutting tool 30 includes a housing 32, a motor (not shown in the figure) received in the housing 32, a transmission assembly (not shown in the figure) located in the housing 32 and used for transmit power, a cutting unit 34 connected to the housing 32, a base 36 connected to the cutting unit 34, and a switch assembly (not shown in the figure) located on the housing 32 and used for controlling on/off of the motor. In the description of the present invention, unless otherwise specified, the direction related terminologies such as front, rear, left, right, upper and lower are all directions relative to normal use of the portable cutting tool, for example, it is defined that a forward direction of the portable cutting tool is front, and a direction opposite to the forward direction of the portable cutting tool is rear.

A power supply of the portable cutting tool 30 is an alternating current power supply, that is, the motor is powered by an alternating current power supply. Certainly, the portable cutting tool 30 may also be powered by a direct current power supply, that is, a battery pack is installed on the portable cutting tool 30, and the battery pack supplies power to the motor.

The motor may be a carbon brush motor, a brushless motor, or the like. Alternatively, corresponding to the power source of the portable cutting tool 30, the motor may be an alternating current motor or a direct current motor. The motor has a motor output shaft (not shown in the figure), and rotations of the motor are output by mounting a gear on the motor output shaft.

The housing 32 includes a front portion 40 and a rear portion 42 that extends in a longitudinal direction, where the transmission assembly is disposed in the front portion 40. In this embodiment, the front portion 40 is a gearbox case, and is connected to the cutting unit 34; the rear portion 42 is used for receiving the motor, and the rear portion 42 is provided with an air inlet (not shown) and an air outlet (not shown). The longitudinal extending axis of the rear portion 42 is E. The motor output shaft is disposed parallel to the longitudinal extending axis E of the rear portion 42.

The cutting unit 34 is disposed on one side of the front portion 40. Because the motor is disposed in the rear portion 42 and is away from the base 36, the front portion 40 has a large usable space on the other side that is away from the cutting unit 34, so that other structures can be disposed therein.

A position where the front portion 40 and the rear portion 42 are connected forms a connection portion 44. To utilize the structure of the connection portion 44 more properly, the connection portion 44 is designed as a gripping portion 44 of the portable cutting tool 30, that is, a user operates the portable cutting tool 30 by gripping the gripping portion 44, so as to perform cutting. When the user grips the gripping portion 44, a fulcrum is formed between the front portion 40 and the rear portion 42; parts on two sides of the fulcrum restrict each other under the effect of respective weights, which implements that after the user grips the gripping portion 44, the portable cutting tool 30 is in a relatively stable state, and a cutting operation can be performed easily, thereby making the operation more comfortable. Preferably, the center of gravity of the portable cutting tool 30 is on the gripping portion 44, and in this case, the portable cutting tool 30 is most comfortable to operate.

Certainly, the gripping portion is not limited to being formed at the connection portion, for example, the gripping portion may also be additionally disposed above the housing 32, where the gripping portion is connected to the front portion 40 and the rear portion 42; persons skilled in the art may further make other alterations, which shall fall within the protection scope of the present invention as long as the function and effect thereof are the same as or similar to those of the present invention.

The longitudinal extending axis of the gripping portion 44 may be disposed substantially parallel to or coincide with the longitudinal extending axis E of the rear portion 42. In this embodiment, the longitudinal extending axis of the gripping portion 44 coincides with the longitudinal extending axis E of the rear portion 42.

Figure 2:
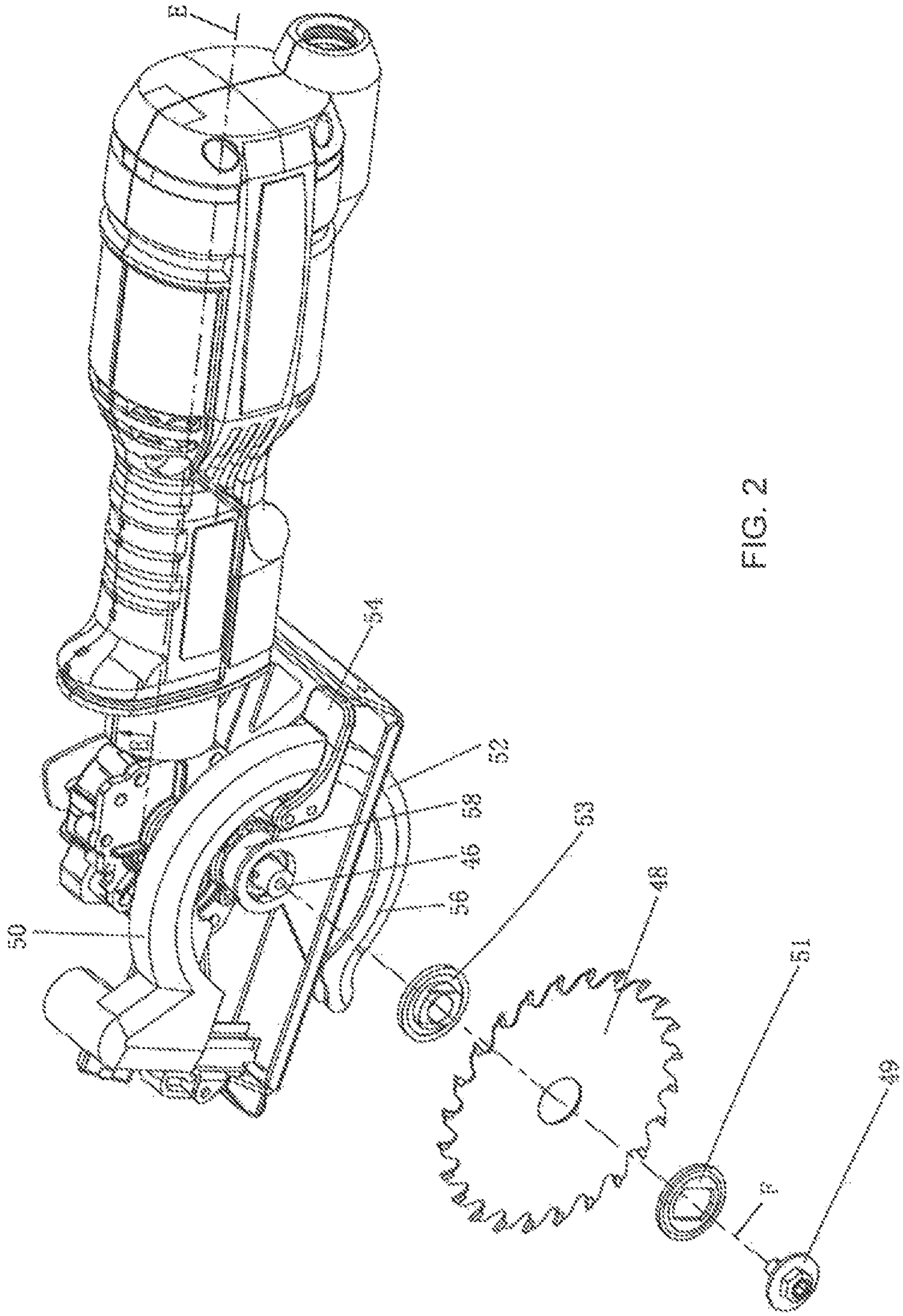
FIG. 2 is a partial three-dimensional exploded view of the portable cutting tool disclosed in FIG. 1.

Referring to FIG. 1 and FIG. 2, the cutting unit 34 includes a blade 48 that is mounted on a blade shaft 46 and driven by the motor to rotate, and a guard assembly. A locking member 49 passes through an upper pressing plate 51 and a lower pressing plate 53, to fix the blade 48 on the blade shaft 46. A fitting structure is disposed between the upper pressing plate 51 and the lower pressing plate 53, so that the blade shaft 46 can transmit power to the blade 48 more efficiently.

The guard assembly includes an upper guard 50 fixedly connected to the front portion 40 and a lower guard 52 that rotates around the axis F of the blade shaft 46. The upper guard 50 is used for covering an upper part of the blade 48, and the lower guard 52 is used for covering a lower part of the blade 48. Certainly, according to different safety requirements, the upper guard 50 and the lower guard 52 may completely cover the whole blade 48 or partially cover the blade 48. During working, the lower guard 52 is driven by a workpiece to rotate around the axis F of the blade shaft 46, so that the lower part of the blade 48 is exposed to cut the workpiece. A grip 54 is disposed on the lower guard 52, and by operating the grip 54, the lower guard 52 rotates around the axis F of the blade shaft 46, so as to expose the lower part of the blade 48.

Referring to FIG. 2, the lower guard 52 includes a receiving portion 56 used for receiving the blade 48 and a hub 58 connected to the receiving portion 56. The hub 58 is rotatably disposed on the blade shaft 46 directly, so as to reduce the diameter of the hub 58, thereby increasing a usable part of the blade 48, and further enhancing an overall cutting capacity of the portable cutting tool.

Figure 3:
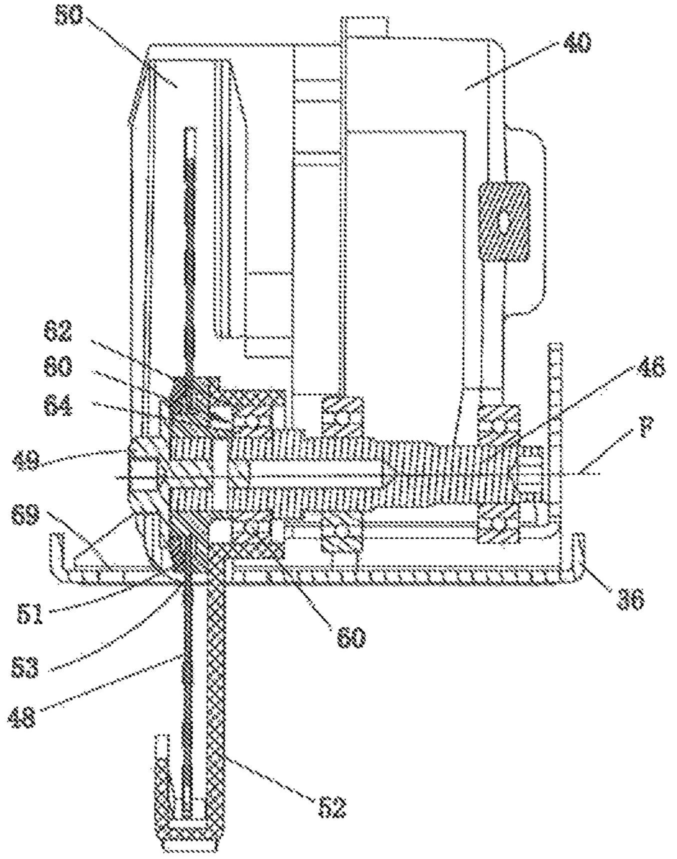
FIG. 3 is a sectional view along an A-A direction in FIG. 1.

Referring to FIG. 3, a bearing 60 is disposed between the blade shaft 46 and the hub 58. The bearing 60 includes a bearing inner race 62 and a bearing outer ring 64. The bearing outer ring 64 is rotatable relative to the bearing inner race 62. The bearing inner race 62 and the blade shaft 46 are in an interference fit. The bearing outer ring 64 and the hub 58 are in an interference fit. The axis of the blade shaft 46 is F. In this manner, the lower guard 52 can rotate around the axis F of the blade shaft 46 smoothly, but does not rotate with the blade shaft 46.

Certainly, the mounting manner of directly disposing the lower guard 52 on the blade shaft 46 or disposing the lower guard 52 on the blade shaft 46 by using the bearing 60 is not limited to being applied to the portable cutting tool listed in this embodiment; this mounting manner is also applicable to cutting tools having a lower guard, such as a common circular electric saw or table-type miter saw, and can achieve an effect of enhancing the cutting capacity.

The transmission assembly is adaptively connected to the motor output shaft, so as to transmit, to the blade 48 through the blade shaft 46, power output by the motor output shaft. In this embodiment, the transmission assembly includes a gear transmission mechanism (not shown in the figure), and the gear transmission mechanism may use worm-gear transmission or bevel gear transmission. In this embodiment, the gear transmission mechanism uses two-stage bevel gear transmission. The axis F of the blade shaft 46 is disposed perpendicular to, or substantially perpendicular to the axis of the motor output shaft.

Figure 4:
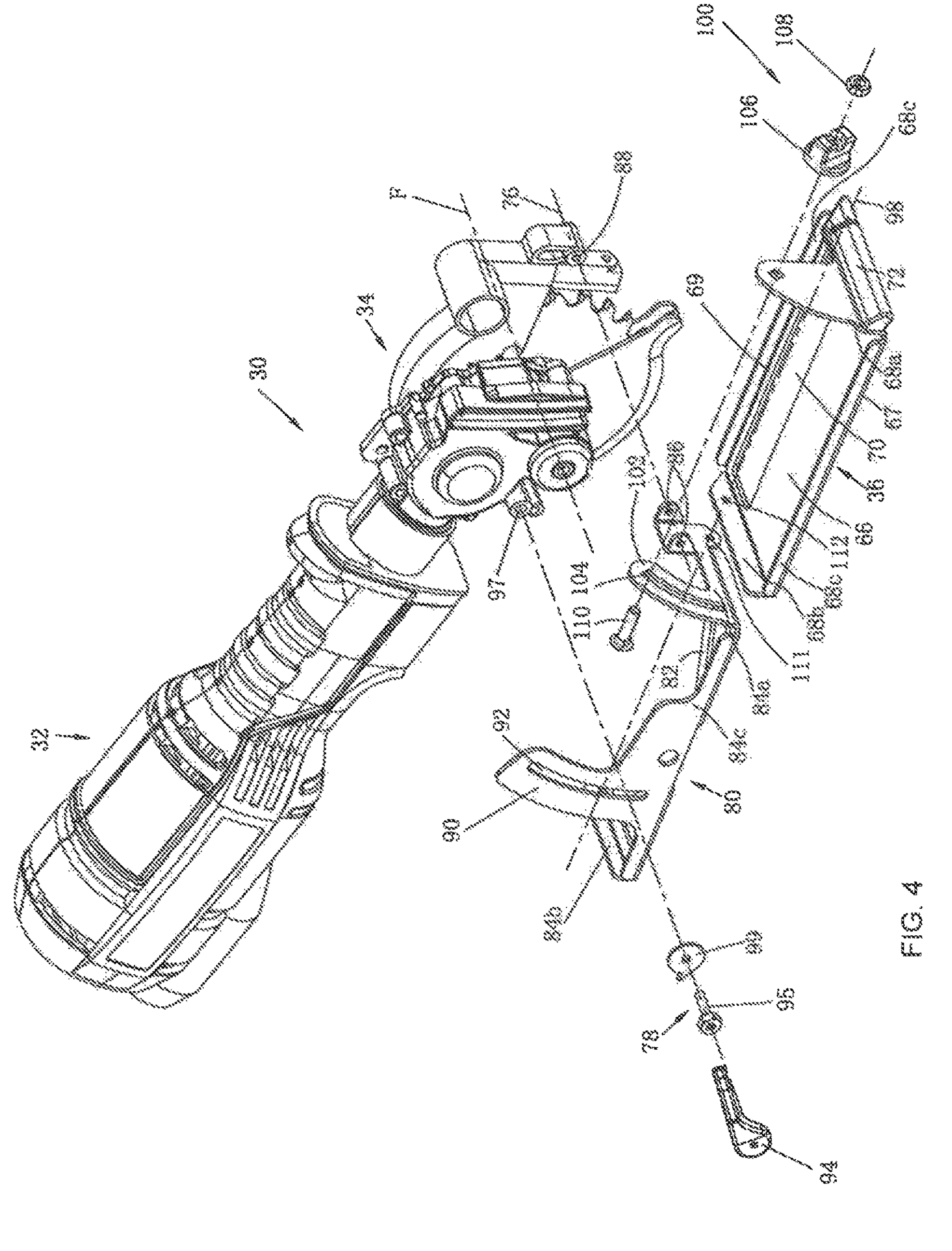
FIG. 4 is a partial three-dimensional exploded view of the portable cutting tool disclosed in FIG. 1.

Referring to FIG. 4, the base 36 includes a base bottom portion 66, and during working, the base bottom portion 66 abuts against a surface of a workpiece. The base bottom portion 66 has a bottom surface 67 in contact with the surface of the workpiece and a top surface 69 that is disposed away from the surface of the workpiece. Base front, rear, left and right side walls **68*a-d* substantially form a circumference and extend upward from the base bottom portion 66. The base bottom portion 66 is provided with a blade through-hole 70 that is used for the blade 48 to pass through. A friction pad 72 is disposed on an external side of the base front side wall 68*a*. Specific functions of the friction pad 72** will be described in detail in the following.

A depth adjusting mechanism is disposed in the portable cutting tool 30 to adjust a cutting depth. The depth adjusting mechanism can make the housing 32 and the cutting unit 34 pivot around a first axis 76 together and locked by a locking device 78 mounted on the housing 32. The first axis 76 is disposed parallel to the axis F of the blade shaft 46.

The portable cutting tool 30 includes a supporting member 80 connected to the base 36. The supporting member 80 includes a supporting bottom portion 82. Supporting member front, rear, and right side walls **84*a-c* extend upward from the supporting bottom portion 82, and no side wall is provided on the left side of the supporting bottom portion 82, so that the blade 48 can pass through the supporting member 80** conveniently.

The supporting member front side wall **84*a* is provided with symmetric mounting holes 86, and the front portion 40 is provided with a through-hole 88. A pin (not shown in the figure) passes through the mounting holes 86 and the through-hole 88, so that the housing 32 and the cutting unit 34 together rotate around the first axis 76 defined by the pin. Certainly, the supporting member 80 and the front portion 40** may also be mounted by using a bolt, a screw, a rivet, or other structures commonly known by persons skilled in the art.

The supporting member 80 includes a depth adjusting holder 90, where the depth adjusting holder 90 extends upward from one side of the supporting member right side wall **84*c*. The depth adjusting holder 90 is provided with a first guide slot 92. The first guide slot 92 is an arc-shaped guide slot, and the center of a circle corresponding to the arc where the first guide slot 92 is located is on the first axis 76**.

The locking device 78 includes a handle 94, a bolt 95 connected on the handle 94, and a threaded hole 97 provided in the front portion 40. The bolt 95 passes through the first guide slot 94 and fits with the threaded hole 97. By rotating the handle 94, the bolt 95 is locked in the threaded hole 97, thereby locking the housing 32 and the cutting unit 34 relative to the supporting member.

In this embodiment, the upper guard 50 and the first guide slot 92 are respectively disposed on two sides of the front portion 40. In this manner, an operator can use the handle 94 conveniently, and moreover, the length of the bolt can be reduced, thereby enhancing the operability.

To facilitate observation of the cutting depth, the depth adjusting holder 90 is provided with a scale (not shown in the figure), which indicates the cutting depth, at a position close to the first guide slot 92, and an indicator 99 is disposed on the bolt 95. Once the bolt 95 is loosened, an operator moves a cutting element 36 so that the bolt 95 slides in the first guide slot 92. The housing 32 and the cutting unit 34 together move around the first axis 76 relative to the base 36 and the supporting member 80 to change the cutting depth of the blade 48. At this time, a cutting angle can be observed by using the indicator 99 and the scale that is provided on the depth adjusting holder 90. Once the cutting unit 34 reaches a desired position, the handle 94 may be rotated so as to tightly fasten the cutting unit 34 at the desired position.

Figure 5:
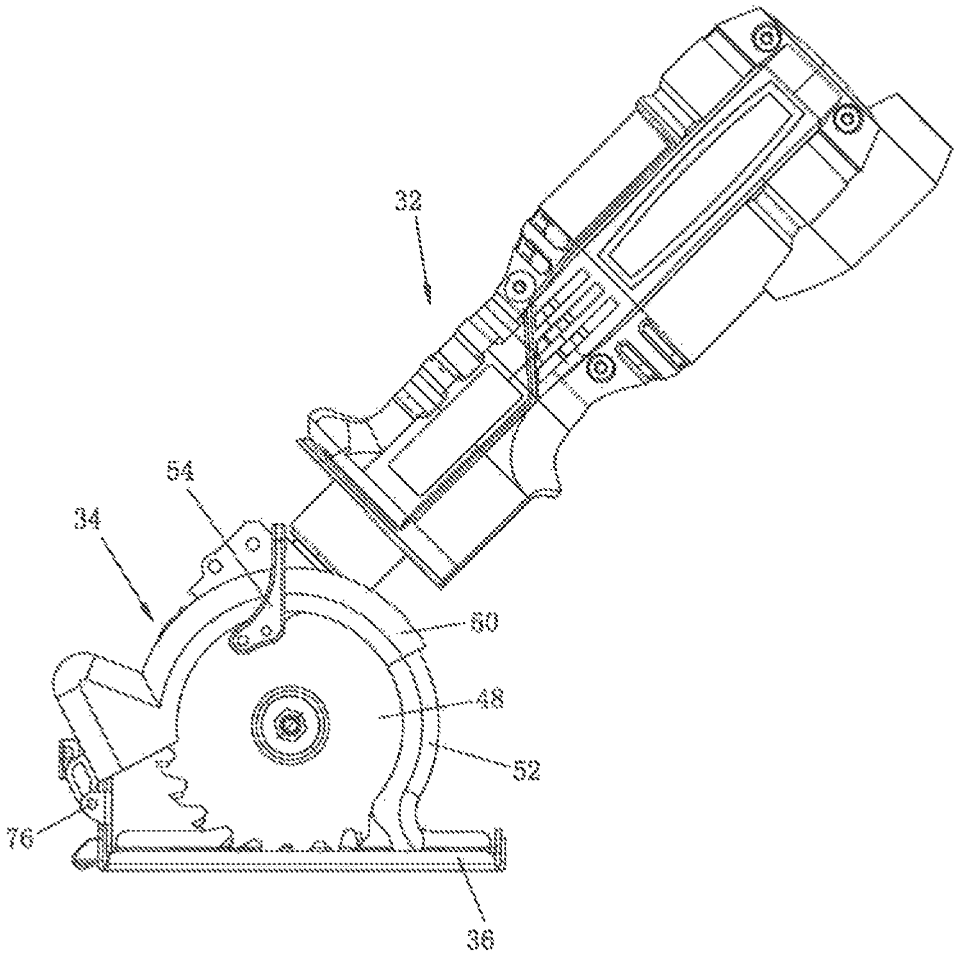
FIG. 5 is a front view of the portable cutting tool disclosed in FIG. 1, where the portable cutting tool is at a minimum cutting position.
Figure 6:
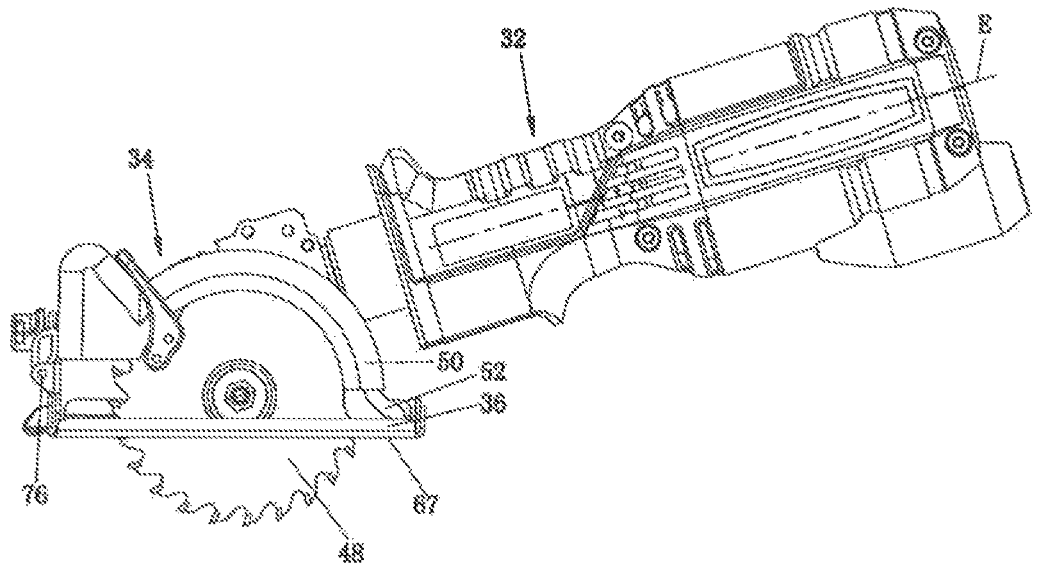
FIG. 6 is a front view of the portable cutting tool disclosed in FIG. 1, where the portable cutting tool is at a maximum cutting position.

As shown in FIG. 5 and FIG. 6, the cutting unit 34 moves around the first axis 76 and between a minimum cutting position and a maximum cutting position. As shown in FIG. 5, at the minimum cutting position, the blade 48 does not pass through the blade through-hole 70 in the base 36, and the distance between the blade shaft 46 and the base 36 is of a maximum value. As shown in FIG. 6, at the maximum cutting position, the blade 48 passes through the blade through-hole 70 in the base 36, and the distance between the blade shaft 46 and the base 36 is of a minimum value. At this position, an angle between the longitudinal extending axis E of the gripping portion 44 and the base 36 is not greater than 20 degrees, which makes an operator much more comfortable.

Referring to FIG. 3 and FIG. 6, at the maximum cutting position, a lower edge of the lower pressing plate 53 is flush with the top surface 69 of the base bottom portion 66. In this manner, the usable part of the blade 48 is increased, thereby enhancing the overall cutting capacity of the portable cutting tool. Certainly, the effect of enhancing the cutting capacity can also be achieved when a small distance exists between the lower edge of the lower pressing plate 53 and the top surface 69 of the base bottom portion 66. However, the distance between the lower edge of the lower pressing plate 53 and the top surface 69 of the base bottom portion 66 should not exceed 10 mm, and may be 6 mm, 4 mm, or the like.

Referring to FIG. 4 again, an angle adjusting structure is disposed in the portable cutting tool 30, to change a cutting angle. The angle adjusting structure can make the housing 32 and the cutting unit 34 pivot around a second axis 98 together and fixed by a locking device 100 mounted on the base 36. The second axis 98 is disposed parallel to the base bottom portion 66.

With a greater distance between the second axis 98 and the depth adjusting holder 90, when the handle 94 is unloosed to perform depth adjustment or angle adjustment, seizing is avoided, and the cutting unit 34 does not shake and is relatively stable. Therefore, in this embodiment, the depth adjusting holder 90 and the second axis 98 are respectively disposed on two sides of the front portion 40, which increases the distance between the depth adjusting holder 90 and the second axis 98. Certainly, the effect of stabilization can also be achieved when the distance between the depth adjusting holder 90 and the second axis 98 is greater than half of the width of the base 36 (it is defined that the width of the base 36 is along the first axis 76).

The supporting member 80 includes an angle adjusting holder 102, where the angle adjusting holder 102 extends upward from the side of the supporting member front side wall 84*a*. The angle adjusting holder 102 is provided with a second guide slot 104. The second guide slot 104 is an arc-shaped guide slot, and the center of a circle corresponding to the arc where the second guide slot 104 is located is on the second axis 98.

The locking device 100 includes a knob 106, a nut 108 connected to the knob 106, and a bolt 110 that fits with the nut 108. The bolt 110 passes through the through-hole in the base front side wall 68*a* and the second guide slot 104, to engage with the nut 110. The knob 106 is screwed tightly to lock the housing 32 and the cutting unit 34 relative to the base 36.

The supporting member front side wall 84*a* and rear side wall 84*b* are provided with symmetric connecting holes 111; the base front side wall 68*a* and rear side wall 68*b* are separately provided with a through-hole 112 (only the through-hole in the base rear side wall 68*b* is shown in the figure). Two pins (not shown in the figure) each pass through the connecting hole 111 and the through-hole 112 that are close to each other, to make the supporting member 80, the housing 32, and the cutting unit 34 together pivot around the second axis 98 defined by the pin. Certainly, the supporting member 80 and the base 36 may also be mounted by using a bolt, a screw, a rivet or other structures commonly known by persons skilled in the art.

To facilitate observation of the cutting angle, the angle adjusting holder 102 is provided with a scale (not shown in the figure), which indicates the cutting angle, at a position close to the second guide slot 104, and a pointer is disposed on the base front side wall 68*a*. Once the knob 106 is loosened, the bolt 110 slides in the second guide slot 104 so that the housing 32, the cutting unit 34 and the supporting member 80 can move around the second axis 98 relative to the base 36 to change the cutting angle of the blade 48. At this time, the cutting angle of the portable cutting tool 30 can be observed by using the pointer disposed on the base front side wall 68*a*. Once the cutting unit 34 reaches a desired position, the knob 106 may be screwed tightly so as to tightly fasten the cutting unit 34 at the desired position.

It can be learned from the above description that, the supporting member 80 includes the depth adjusting holder 90 and the angle adjusting holder 102; in other words, both the first guide slot 92 used for depth adjustment and the second guide slot 104 used for angle adjustment are provided on the supporting member 80. In this manner, cutting costs can be reduced; moreover, the rigidity of the supporting member 80 can be enhanced, and the cutting precision of the portable cutting tool 30 can be improved.

Figure 7:
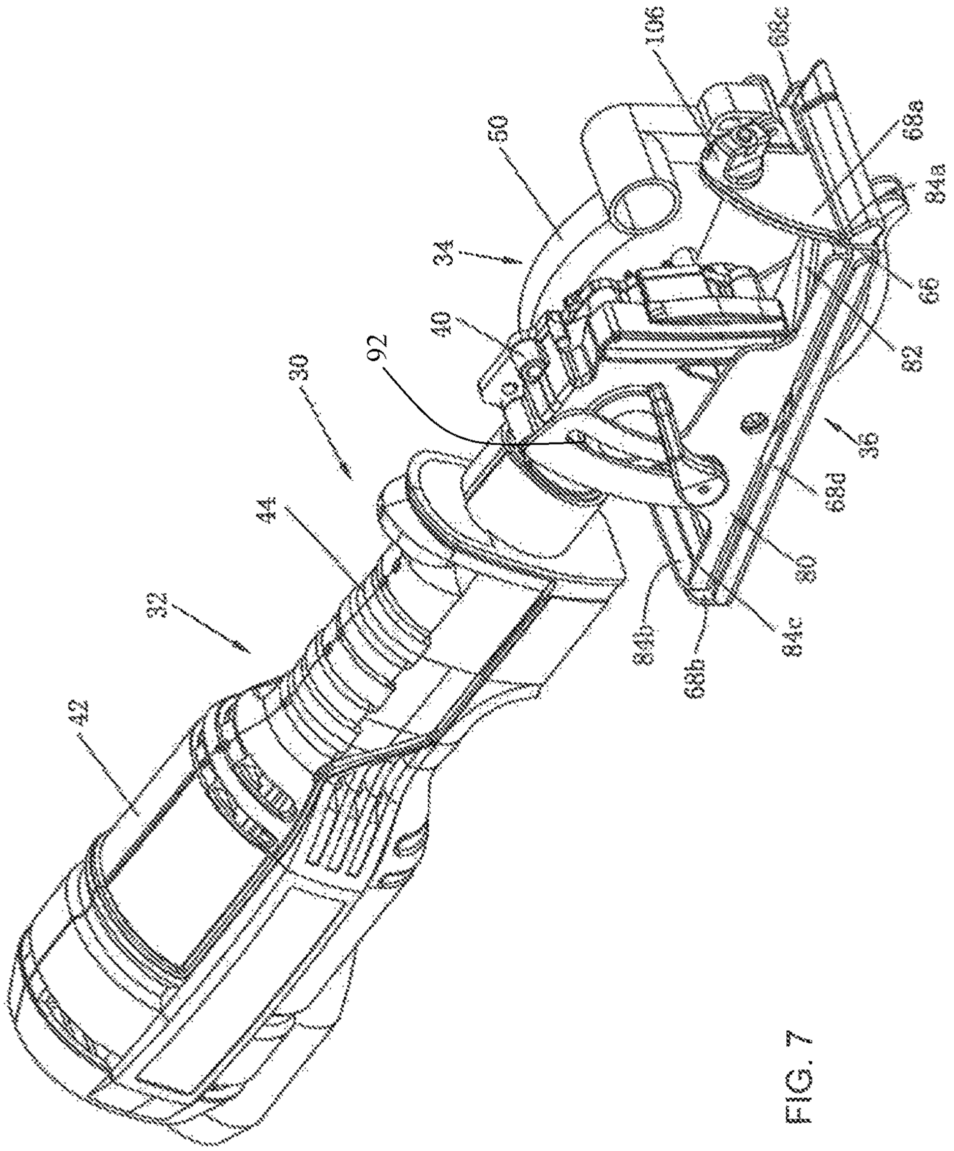
FIG. 7 is a three-dimensional view of the portable cutting tool disclosed in FIG. 1 viewed from another side, where a blade and a base bottom portion are disposed perpendicular to each other.
Figure 8:
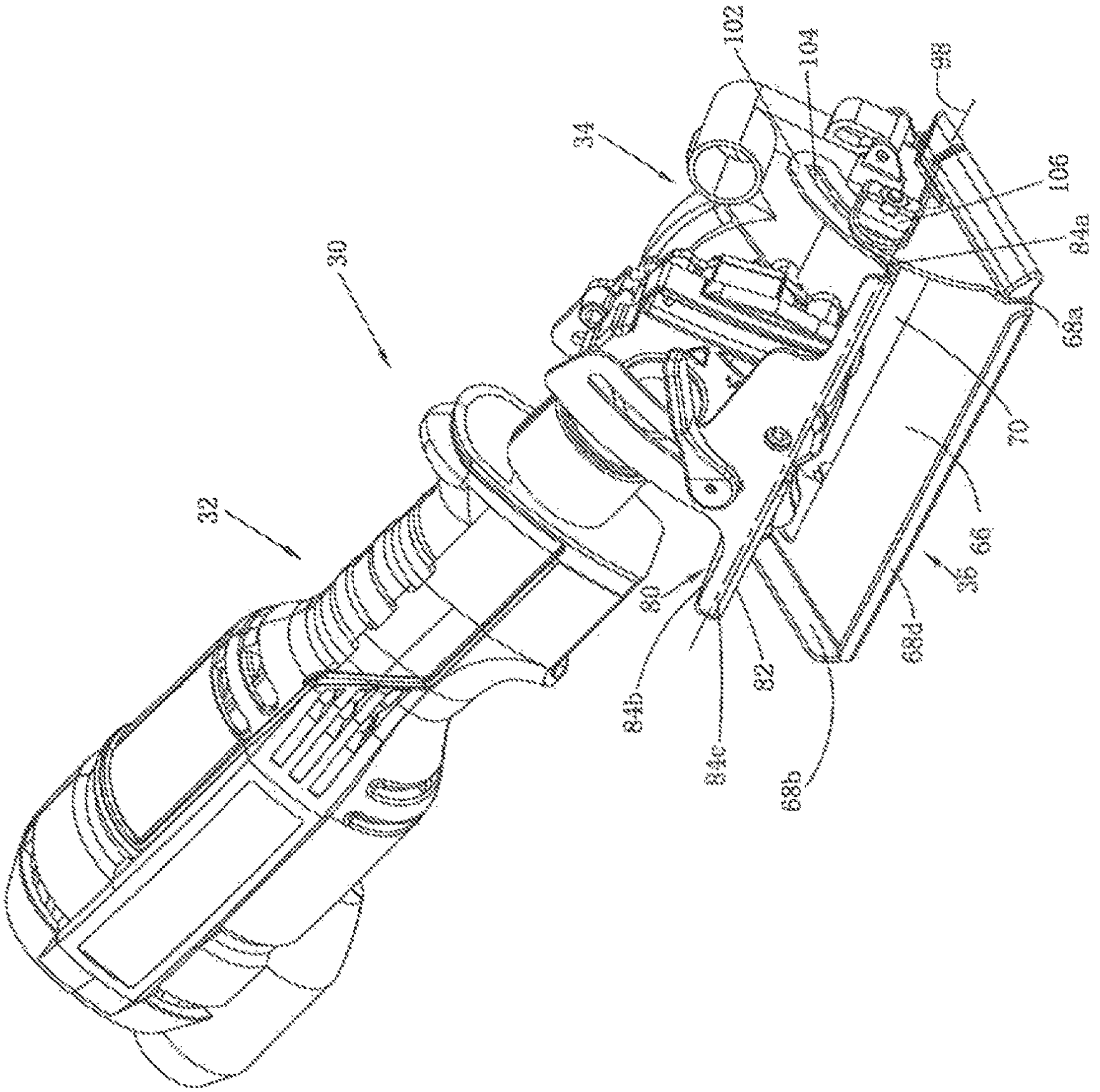
FIG. 8 is a three-dimensional view of the portable cutting tool disclosed in FIG. 1 viewed from another side, where a blade and a base bottom portion are disposed in a manner of being inclined relative to each other.

As shown in FIG. 7, when the blade 48 is perpendicular to the base bottom portion 66, the base front, rear, left, and right side walls 68*a-d* substantially form a circumference to enclose the supporting member front, rear, and right side walls 84*a-c*, and the supporting member front, rear, and right side walls 84*a-c* are separately adhered to inner sides of the base front side wall 68*a*, the base rear side wall 68*b*, and the base right side wall 68*d*. At this time, the supporting bottom portion 82 is adhered to the base bottom portion 66. As shown in FIG. 8, when the knob 106 is loosened, the bolt 110 slides in the second guide slot 104, and the supporting member 80 rotates around the second axis 98; at this time, the supporting member front, rear, and right side walls 84*a-c* are separated from the inner sides of the base front side wall 68*a*, the base rear side wall 68*b*, and the base right side wall 68*d*. An angle formed between the supporting bottom portion 82 and the base bottom portion 66 is equal to an angle formed between the blade 48 and the base bottom portion 66, namely, an inclined cutting angle of the blade 48.

Figure 9:
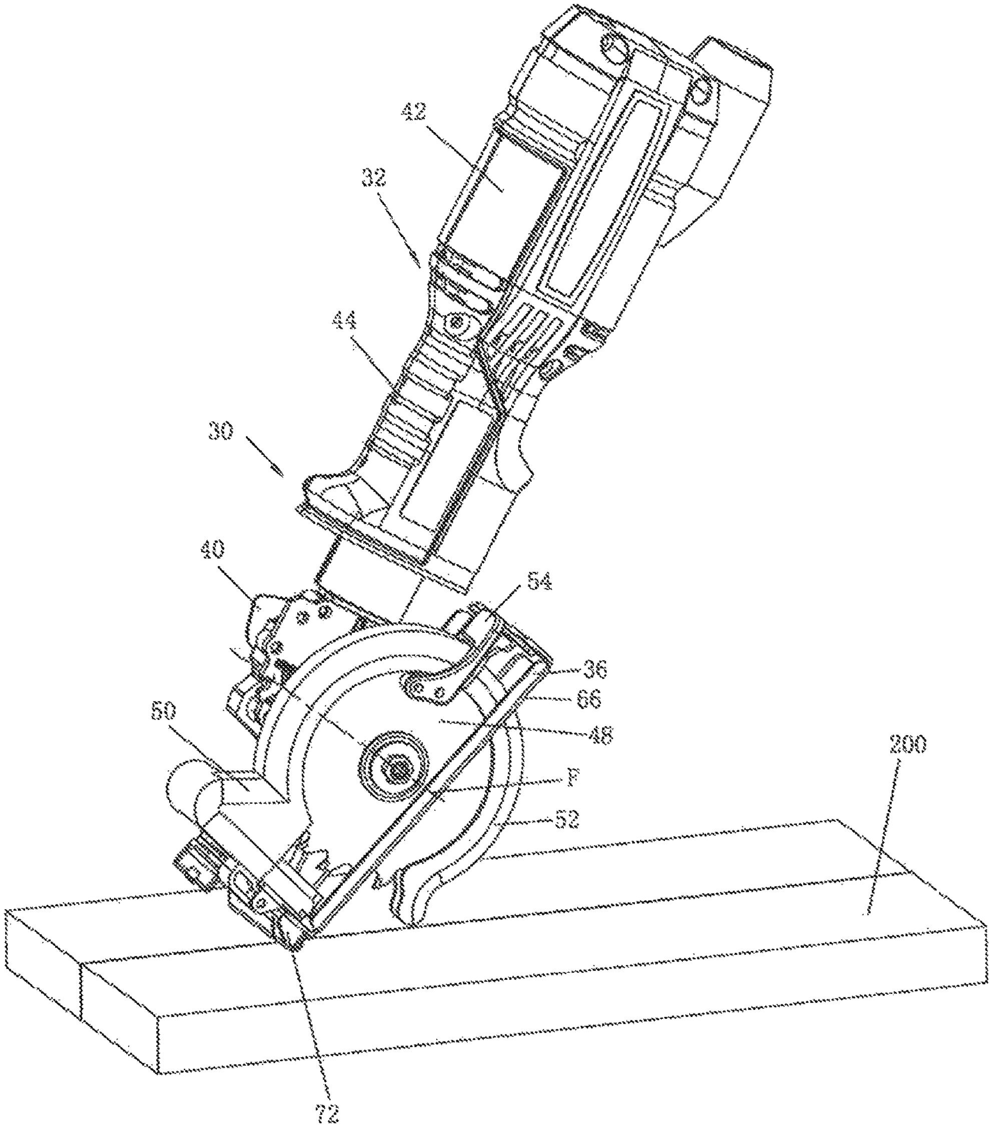
FIG. 9 is a schematic view of the portable cutting tool disclosed in FIG. 1 during insertion-type cutting.
Figure 10:
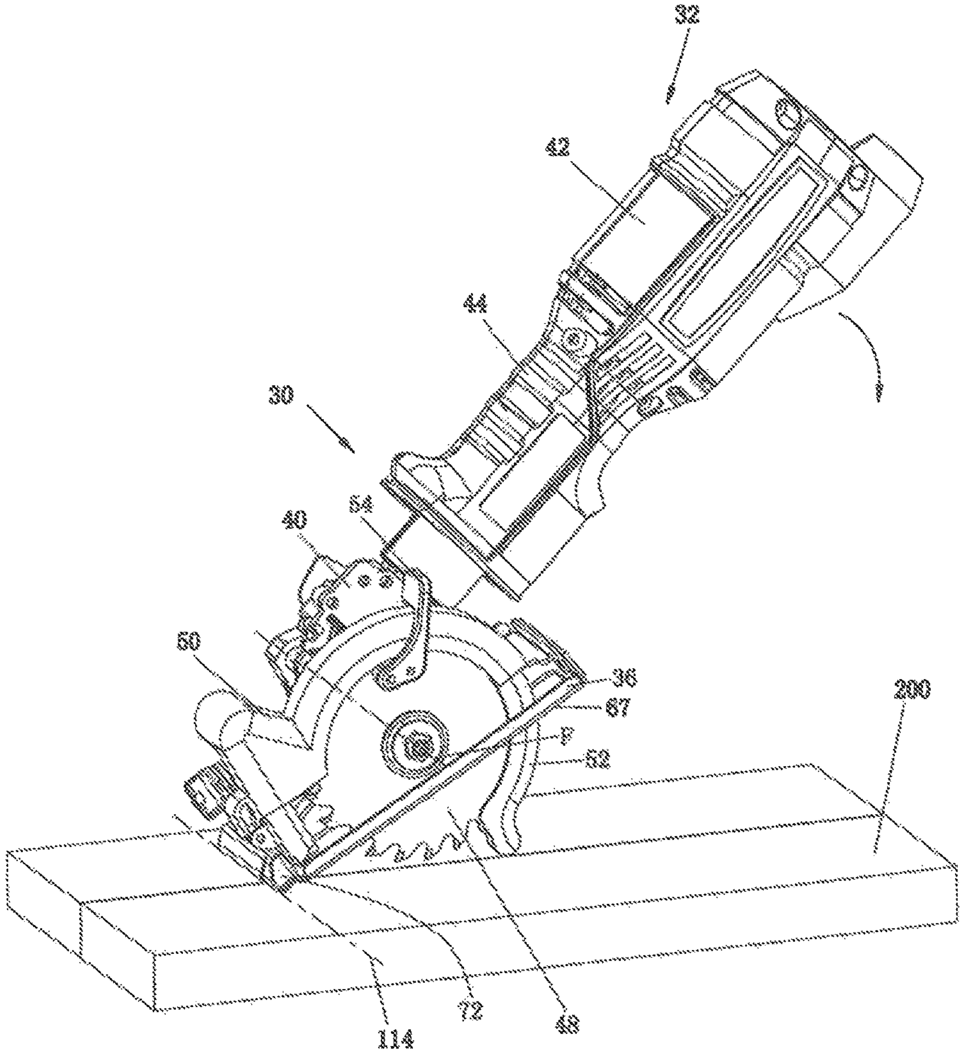
FIG. 10 is a schematic view of the portable cutting tool disclosed in FIG. 1 during insertion-type cutting.

The portable cutting tool 30 has a translational cutting mode and an insertion-type cutting mode. During insertion-type cutting, the motor is started. As shown in FIG. 9, the friction pad 72 abuts against a surface of workpiece 200, and an operator grips the gripping portion 44 with one hand and operates the grip 54 with the other hand, so that the lower guard 52 rotates around the axis F of the blade shaft 46 relative to the upper guard 50; next, as shown in FIG. 10, the operator grips the gripping portion 44 and applies a pressure to the gripping portion 44, and at this time, the portable cutting tool 30 is rotated with the contacting line 114 between the friction pad 72 and the workpiece 200 as a rotation axis, so that the whole portable cutting tool 30 rotates clockwise; during rotation, the lower guard 52 may be further pushed by the grip 54 or the workpiece 200, to rotate around the axis F of the blade shaft 46, so that the blade 48 exposed from the lower guard 52 can process the workpiece. In this manner, the operator can cut a slot at the middle of the workpiece 200. Further referring to FIG. 11, the portable cutting tool 30 rotates clockwise until the bottom surface 67 of the base bottom portion 66 is completely adhered to the surface of the workpiece 200; at this time, the portable cutting tool 30 can be pushed forward to cut the workpiece, so that the portable cutting tool 30 processes an elongated slot of a given length.

Figure 11:
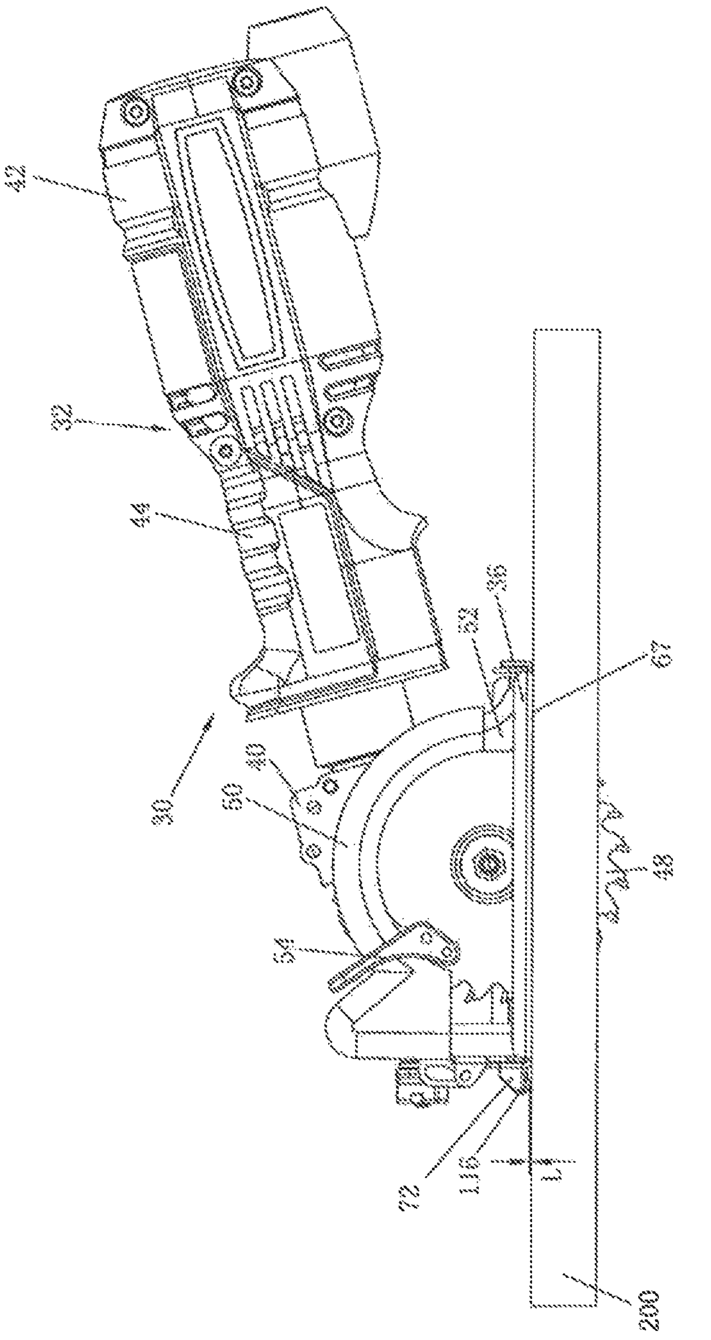
FIG. 11 is a schematic view of the portable cutting tool disclosed in FIG. 1 during insertion-type cutting.

Further referring to FIG. 11, the friction pad 72 is usually made of a wear-resisting and anti-slipping material, such as rubber or silicone. Therefore, the friction pad 72 can prevent the base 36 from slipping on the surface of the workpiece 200, so that the cutting is not affected; it is also avoided that the friction pad 72 damages the surface of the workpiece 200 during rotation of the portable cutting tool 30.

The friction pad 72 includes a curved surface 116 in contact with the surface of the workpiece 200. The curved surface 116 may be an arc surface or at least a part of the curved surface 116 is an arc surface. The curved surface 116 facilitates the rotation of the portable cutting tool 30 and makes the rotation stable, and can better protect the surface of the workpiece 200 during rotation of the portable cutting tool 30.

A gap is reserved between the friction pad 72 and the bottom surface 67 of the base bottom portion 66, and certainly, a smaller gap makes the rotation of the portable cutting tool 30 easier. That a gap is reserved between the friction pad 72 and the bottom surface 67 means that: when the bottom surface 67 is adhered to the surface of the workpiece 200, a given gap L exists between the lowermost end of the friction pad 72 and the surface of the workpiece 200, and in this manner, when the portable cutting tool 30 is pushed to move along the surface of the workpiece 200, the friction pad 72 is not in contact with the surface of the workpiece 200 and therefore does not affect the pushing on the portable cutting tool 30.

Certainly, the manner of disposing the friction pad 72 on the base 36 so that an operator can perform insertion-type cutting conveniently is not limited to being applied to the portable cutting tool listed in this embodiment; this manner is also applicable to the conventional circular electric saw, and can also achieve the effect of insertion-type cutting.

Figure 12:
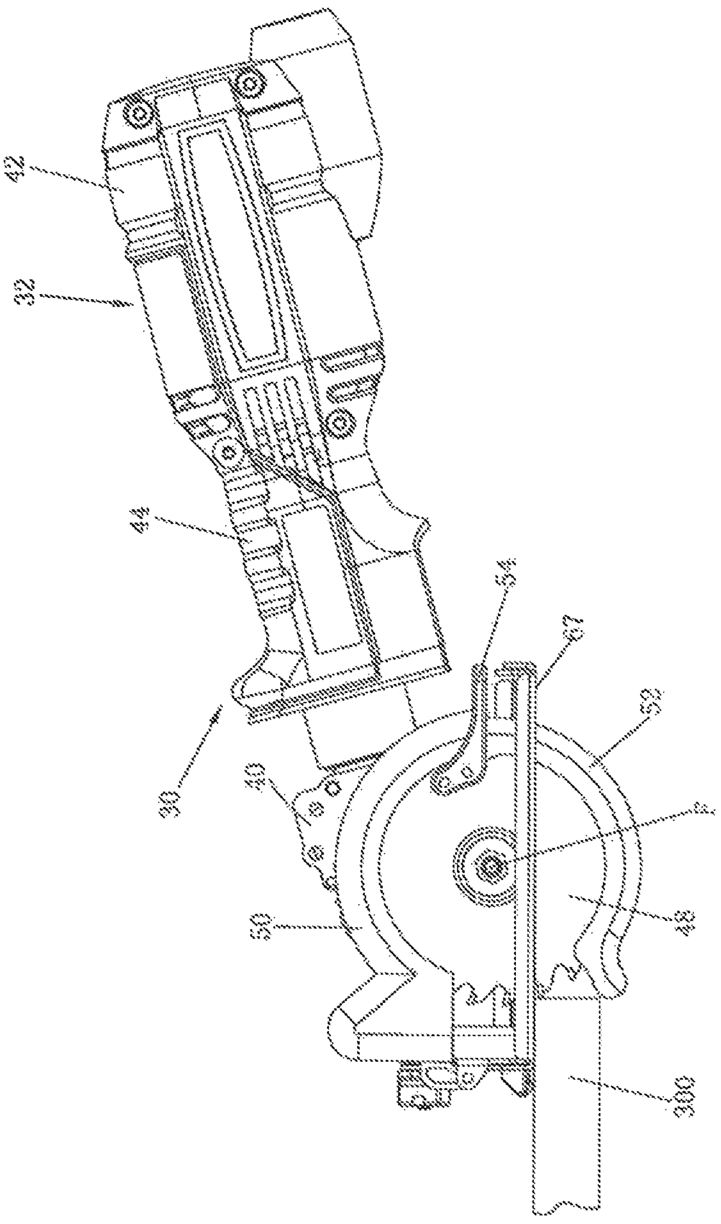
FIG. 12 is a schematic view of the portable cutting tool disclosed in FIG. 1 during translational cutting.

During translational cutting, as shown in FIG. 12, the motor is turned on by using the switch assembly; the base bottom portion 66 abuts against a surface of a workpiece 300, and the portable cutting tool 30 is pushed in a manner of being parallel to the surface of the workpiece 300. During pushing, the workpiece 300 pushes the lower guard 52 to further rotate around the axis F of the blade shaft 46, so that the blade 48 exposed from the lower guard 52 can process the workpiece 300. In this manner, cutting can be started from one end of the workpiece 300. By further pushing the portable cutting tool 30 forward to cut the workpiece, an elongated slot of a given length can be formed or the workpiece 300 can be severed.

Figure 13:
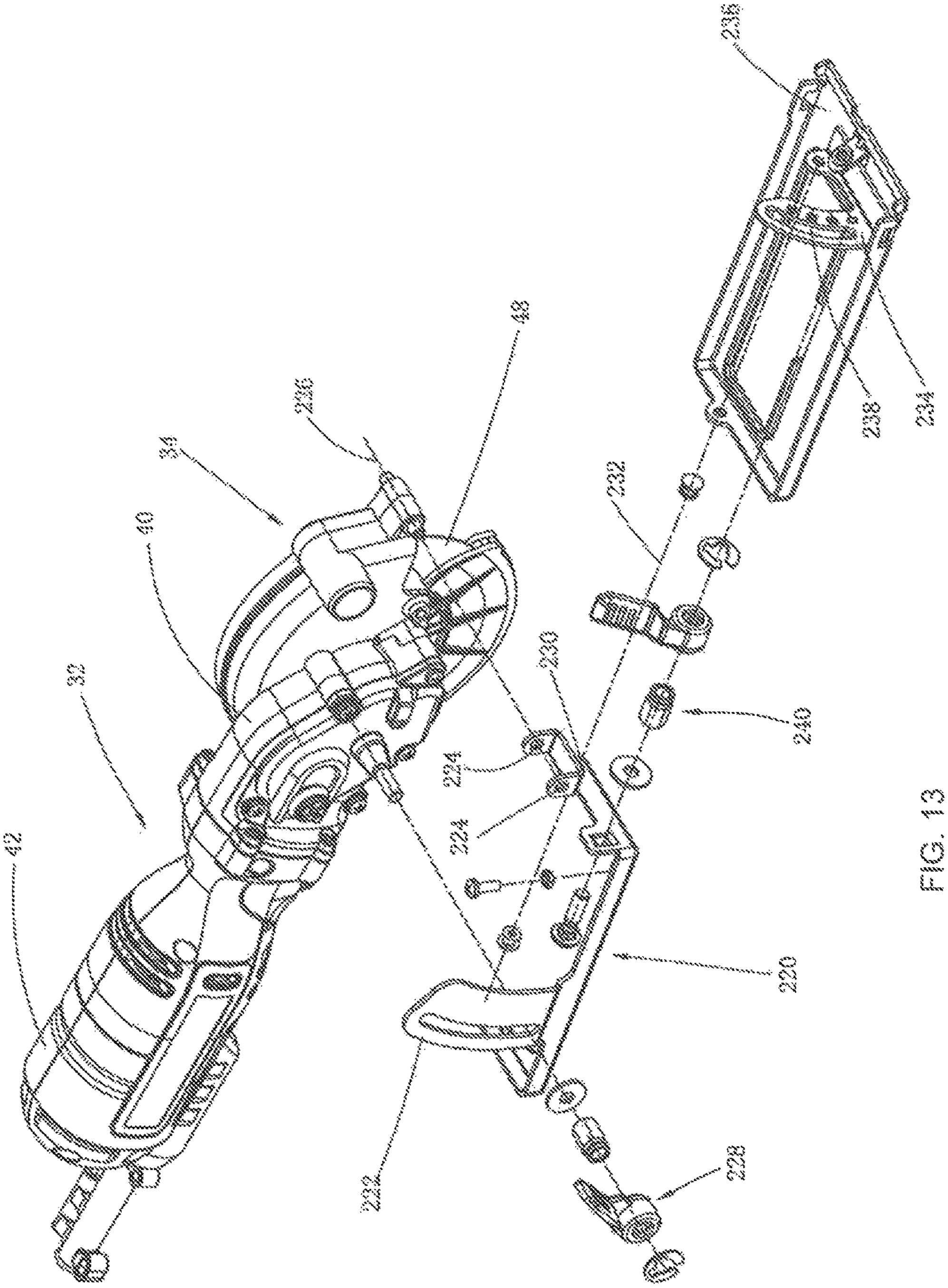
FIG. 13 is a partial three-dimensional exploded view of a portable cutting tool in a second embodiment of the present invention.

As shown in FIG. 13, a second embodiment of the present invention is substantially the same as the first embodiment, and the second embodiment also includes a depth adjusting mechanism used for adjusting a cutting depth. A supporting member 220 is provided with a depth adjusting holder 222 and symmetric mounting holes 224, so that the cutting unit 34 pivots around a first axis 226, thereby implementing adjustment of the cutting depth, and the cutting unit 34 is fixed by a locking device 228.

The difference lies in the angle adjusting structure used for changing a cutting angle. In this embodiment, the supporting member 220 is provided with a connecting hole 230, that is, a position of a second axis 232 is defined on the supporting member 220. An angle adjusting holder 234 is disposed on a base 236. The angle adjusting holder 234 is provided with a second guide slot 238. The second guide slot 238 is an arc-shaped guide slot, and the center of a circle corresponding to the arc where the second guide slot 238 is located is on the second axis 232.

In this manner, the cutting unit 34 pivots around the second axis 232, to implement adjustment of the cutting angle, and the cutting unit 34 is fixed by a locking device 240.

Certainly, when the mounting holes 224 that determine the first axis 226, the depth adjusting holder 222, and the connecting hole 230 that determines the second axis 232 are all provided on the supporting member 220, the cutting costs can also be reduced; moreover, the effect of enhancing the rigidity of the supporting member 220 and improving the cutting precision of the portable cutting tool can also be achieved.

By disposing the depth adjusting holder 222 and the second axis 232 separately on two sides of the front portion 40, the following effects can also be achieved: during depth adjustment or angle adjustment, seizing is avoided, and the cutting unit 34 does not shake and is relatively stable.

Figure 14:
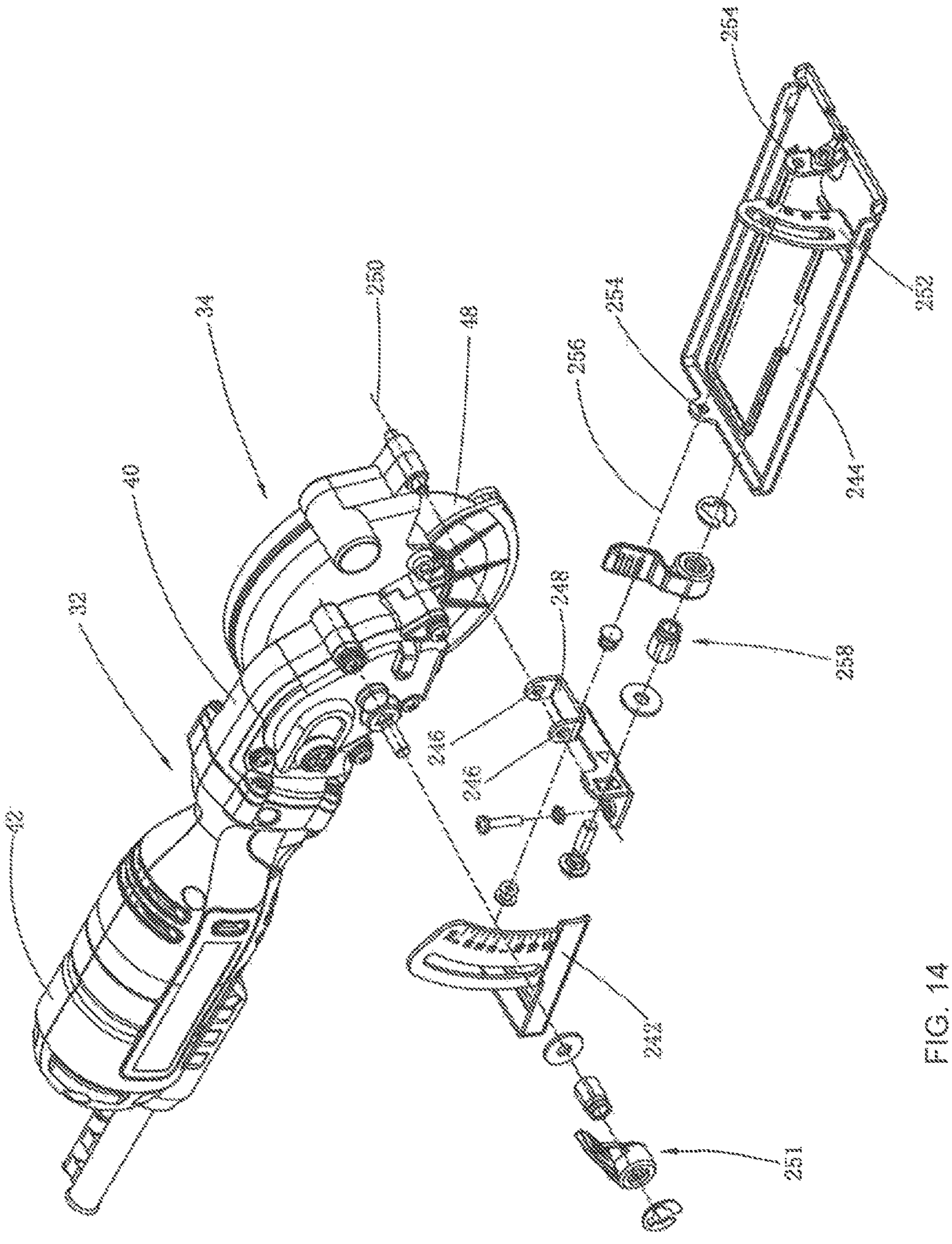
FIG. 14 is a partial three-dimensional exploded view of a portable cutting tool in a third embodiment of the present invention.

As shown in FIG. 14, a third embodiment of the present invention is substantially the same as the first embodiment, and the difference lies in that: a depth adjusting holder 242 is fixedly disposed on a base 244, and a fixed mount 248 where a connecting hole 246 is located is also fixedly disposed on the base 244. In this manner, the cutting unit 34 pivots around a first axis 250 to implement adjustment of a cutting depth, and the cutting unit 34 is fixed by a locking device 251.

An angle adjusting holder 252 is fixedly disposed on the base 244, and mounting holes 254 are provided on the base 244. In this manner, the cutting unit 34 pivots around a second axis 256, to implement adjustment of the cutting angle, and the cutting unit 34 is fixed by a locking device 258.

The depth adjusting holder 244 and the second axis 256 are respectively disposed on two sides of the front portion 40; in this manner, the following effects can also be achieved: during depth adjustment or angle adjustment, seizing is avoided, and the cutting unit 34 does not shake and is relatively stable.

The present invention is not limited to the foregoing embodiments, and all other modifications that are made by persons skilled in the art under the teaching of the technical essence of the present invention and implement same or similar functions as the present invention shall fall within the protection scope of the present invention.

The invention claimed is:

1. A portable cutting tool, comprising:
a blade;
a motor for driving the blade to rotate, wherein the motor comprises an output shaft;
a guard assembly comprising an upper guard for receiving the blade and a lower guard, wherein the lower guard is rotatable relative to the upper guard to expose the blade to cut a workpiece;
a base pivotally connected to the upper guard, wherein the base is provided with a blade through-hole for the blade to pass through, and further comprises a base bottom portion for abutting against the workpiece and a front side wall extending upwards from the base bottom portion;
a housing, comprising:
a front portion having a case wall presenting an external surface, with a first section of the external surface facing outwardly in a first direction to define a left outside of the front portion, and with a second portion of the external surface facing outwardly in a second direction opposite the first direction to define a right outside of the front portion,
a rear portion extending longitudinally, and
a gripping portion disposed between the front portion and the rear portion,
wherein the blade is rotatably disposed on the front portion by a blade shaft, the motor is rotatably disposed in the rear portion, and the blade shaft is perpendicular to the output shaft; and
a supporting member connected to the base, and the supporting member comprising a depth adjusting holder, wherein one of the upper guard and the depth adjusting holder is disposed on the left outside of the front portion of the housing along the external surface and the other one of the upper guard and the depth adjusting holder is disposed on the right outside of the front portion of the housing along the external surface.

2. The portable cutting tool according to claim 1, wherein the upper guard is rotatably connected to the supporting member around a first axis which is parallel with the blade shaft to adjust a cutting depth, and the upper guard is movable between the minimum cutting position at which the blade is not exposed out of the blade through-hole and a maximum cutting position at which the blade is exposed out of the blade through-hole by a maximum depth.

3. The portable cutting tool according to claim 2, wherein in the maximum cutting position, an angle of the longitudinal extending axis of the gripping portion and base bottom portion is not greater than 20 degrees.

4. The portable cutting tool according to claim 2, wherein the supporting member is pivotally connected to the base around a second axis which is parallel with the base bottom portion to adjust a cutting angle, wherein the supporting member is provided with a second guide slot which is an arc-shaped guide slot, and the center of a circle corresponding to the arc where the second guide slot is located is on the second axis.

5. The portable cutting tool according to claim 1, wherein the upper guard is pivotable around a first axis whixcch is parallel with the blade shaft, wherein the depth adjusting holder is provided with a first guide slot which is an arc-shaped guide slot, and the center of a circle corresponding to the arc where the first guide slot is located is on the first axis.

6. The portable cutting tool according to claim 1, wherein a friction pad is disposed on the front side wall for contacting with the workpieces.

7. The portable cutting tool according to claim 6, wherein the friction pad comprises a curved surface for contacting with the workpieces.

8. The portable cutting tool according to claim 1, wherein the lower guard is rotatably disposed on the blade shaft.

9. The portable cutting tool according to claim 8, wherein the lower guard is rotatably disposed on the blade shaft by a bearing.

10. A portable cutting tool, comprising:
a blade;
a motor for driving the blade to rotate, wherein the motor comprises an output shaft;
a guard assembly comprising an upper guard for receiving the blade and a lower guard, wherein the lower guard is rotatable relative to the upper guard to expose the blade to cut a workpiece;
a base connected to the upper guard, wherein the base is provided with a blade through-hole for the blade to pass through, and further comprises a base bottom portion for abutting against the workpiece and a front side wall extending upwards from the base bottom portion;
a supporting member connected to the base, wherein the upper guard is rotatably connected to the supporting member around a first axis which is parallel with the blade shaft to adjust a cutting depth, wherein and the upper guard is movable between the minimum cutting position at which the blade is not exposed out of the blade through-hole and a maximum cutting position at which the blade is exposed out of the blade through-hole by a maximum depth; and
a housing, comprising:
a front portion having a case wall presenting an external surface, with a first section of the external surface facing outwardly in a first direction to define a left outside of the front portion, and with a second portion of the external surface facing outwardly in a second direction opposite the first direction to define a right outside of the front portion,
a rear portion extending longitudinally, and
a gripping portion disposed between the front portion and the rear portion,
wherein the blade is rotatably disposed on the front portion by a blade shaft, the motor is rotatably disposed in the rear portion, and the blade shaft is perpendicular to the output shaft;
wherein the supporting member comprises a depth adjusting holder, wherein one of the upper guard and the depth adjusting holder is disposed on the left outside of the front portion of the housing along the external surface and the other one of the upper guard and the depth adjusting holder is disposed on the right outside of the front portion of the housing along the external surface.

11. The portable cutting tool according to claim 10, wherein in the maximum cutting position, an angle of the longitudinal extending axis of the gripping portion and base bottom portion is not greater than 20 degrees.

12. The portable cutting tool according to claim 10, wherein the depth adjusting holder is provided with a first guide slot which is an arc-shaped guide slot, and the center of a circle corresponding to the arc where the first guide slot is located is on the first axis.

13. The portable cutting tool according to claim 10, wherein the supporting member is pivotally connected to the base around a second axis which is parallel with the base bottom portion to adjust a cutting angle, wherein the supporting member is provided with a second guide slot which is an arc-shaped guide slot, and the center of a circle corresponding to the arc where the second guide slot is located is on the second axis.

14. The portable cutting tool according to claim 10, wherein the lower guard is rotatably disposed on the blade shaft.

15. The portable cutting tool according to claim 14, wherein the lower guard is rotatably disposed on the blade shaft by a bearing.

16. The portable cutting tool according to claim 10, wherein a friction pad is disposed on the front side wall for contacting with the workpieces.

17. The portable cutting tool according to claim 16, wherein the frication pad comprises a curved surface for contacting with the workpieces.

18. A portable cutting tool, comprising:

a blade;

a motor for driving the blade to rotate, wherein the motor comprises an output shaft;

a guard assembly comprising an upper guard for receiving the blade and a lower guard, wherein the lower guard is rotatable relative to the upper guard to expose the blade to cut a workpiece;

a base connected to the upper guard, wherein the base is provided with a blade through-hole for the blade to pass through;

a housing, comprising:

a front portion having a case wall presenting an external surface, with a first section of the external surface facing outwardly in a first direction to define a left outside of the front portion, and with a second portion of the external surface facing outwardly in a second direction opposite the first direction to define a right outside of the front portion, a rear portion extending longitudinally, and a gripping portion disposed between the front portion and the rear portion, wherein the blade is rotatably disposed on the front portion by a blade shaft, the motor is rotatably disposed in the rear portion, and the blade shaft is perpendicular to the output shaft; and a supporting member connected to the base, and the supporting member comprising a depth adjusting holder, wherein one of the upper guard and the depth adjusting holder is disposed on the left outside of the front portion of the housing along the external surface and the other one of the upper guard and the depth adjusting holder is disposed on the right outside of the front portion of the housing along the external surface.

* * * * *